United States Patent [19]

Yammoto et al.

[11] Patent Number: 5,102,705

[45] Date of Patent: Apr. 7, 1992

[54] BOTTLES AND METHODS FOR MAKING THEREOF

[75] Inventors: Kazuhito Yammoto; Hiroji Niimi; Nobuyasu Kumura, all of Yamaguchi, Japan

[73] Assignee: Mitsui Petrochemical Industries, Ltd., Tokyo, Japan

[21] Appl. No.: 480,771

[22] Filed: Feb. 16, 1990

[30] Foreign Application Priority Data

Feb. 17, 1989 [JP] Japan .................................. 1-37845
Feb. 17, 1989 [JP] Japan .................................. 1-37846
Feb. 23, 1989 [JP] Japan .................................. 1-43869

[51] Int. Cl.⁵ ...................... B29D 23/00; B29D 23/03; B29C 17/07
[52] U.S. Cl. ................................ 428/36.92; 428/369; 428/366; 264/532; 264/537; 525/437; 525/444
[58] Field of Search .................... 428/34.1, 36.92, 518, 428/36.9, 35.7, 36.6, 36.7; 264/340, 532, 537; 525/437, 444

[56] References Cited

U.S. PATENT DOCUMENTS

| 4,082,854 | 4/1978 | Yamada et al. | 426/106 |
| 4,385,089 | 5/1983 | Bannebat et al. | 428/35 |
| 4,405,400 | 9/1983 | Peterson-Hoj | 156/244.11 |
| 4,579,784 | 4/1986 | Lemstra et al. | 488/516 |
| 4,734,304 | 3/1988 | Tsubone et al. | 428/35 |
| 4,959,421 | 9/1990 | Hirahara et al. | 525/437 |

FOREIGN PATENT DOCUMENTS 2052363  1/1981  United Kingdom .
2052367  1/1981  United Kingdom .

Primary Examiner—James J. Seidleck
Assistant Examiner—Charles R. Nold
Attorney, Agent, or Firm—Sherman and Shalloway

[57] ABSTRACT

Presented in this invention are a bottle made of polyethylene naphthalate resin and formed by stretching a preform so that the stretch index defined as follows be 130 cm or more, wherein gas barrier properties are improved greatly.

$$\text{Stretch index} = \frac{\text{Internal volume of stretched bottle (excluding neck portion)}}{\text{Internal volume of preform before stretching (excluding neck portion)}} \times \frac{1}{f}$$

$$f = \frac{\text{Internal surface area of stretched bottle (excluding neck portion)}}{\text{Internal volume of stretched bottle (excluding neck portion)}} \; (cm^{-1})$$

14 Claims, 3 Drawing Sheets

BOTTLES AND METHODS FOR MAKING THEREOF

FIELD OF THE INVENTION

This invention relates to a bottle made of polyethylene naphthalate resin and a manufacturing method thereof, and more particularly to a bottle made of polyethylene naphthalate resin having superior gas barrier properties, heat resistance and transparency, and a manufacturing method thereof.

BACKGROUND OF THE INVENTION

Glass has been widely used as a material for containers of seasonings, oils, juices, carbonated drinks, beer, Japanese sake, cosmetics, detergents and others. Glass containers, however, are usually recovered and recycled after use because they need high manufacturing costs. Glass containers are, moreover, so heavy as to require high transportation cost, and so fragile as to need careful handling.

In order to solve these problems of glass containers, a variety of plastic containers have recently come to be used rapidly in substitution for glass containers. As materials, various plastics are used depending on the type of contents and purpose of use. For example, polyethylene terephthalate and polyethylene naphthalate are employed for containers of juices, soft drinks, carbonated drinks, seasonings, detergents, cosmetics and others because they are superior in mechanical strength, heat resistance, transparency and gas barrier properties. In the above usage, blow molded containers to be filled with juices, soft drinks, and carbonated drinks are expected to be sterilized and filled with contents at high temperature, and therefore they are required to be made of resin having an excellent heat resistance capable of withstanding high-temperature filling. Such blow molded containers are, moreover, expected to have excellent transparency and form stability which brings less scattering of internal volume of the containers.

Conventionally known bottles made of polyethylene terephthalate or polyethylene naphthalate have high gas barrier properties and heat resistance, but bottles made of synthetic resin having further excellent transparency and heat resistance in addition to gas barrier properties are desired to be developed.

The inventors made every effort for obtaining bottles of synthetic resin having superior heat resistance and transparency as well as gas barrier property, and found out that gas barrier properties were extraordinarily improved in bottles made of polyethylene naphthalate resin wherein a stretch index defined as follows satisfied specific conditions, thereby accomplishing a first invention.

The inventors also found out that gas barrier properties were enhanced greatly in bottles made of polyethylene naphthalate resin, wherein permeability constant Pc to carbon dioxide gas defined as follows was not more than a specific value, and at the same time, the mean thickness constant Tc of body at intermediate part, which is defined below, was not more than a specific value, thereby reaching a second invention.

The inventors, moreover, found out that gas barrier properties were extremely superior and heat resistance was superior in stretched bottle made of polyethylene naphthalate resin wherein stretched polyethylene naphthalate resin at the intermediate part of the bottle body showed peak values at specific positions in an X-ray interference intensity distribution curve, thereby establishing a third invention.

Meanwhile, bottles made of polyethylene naphthalate resin or films made of polyethylene naphthalate resin are already known, for example, in Japanese Patent Publn. No. 49-22945, but the known bottles or films made of polyethylene naphthalate do not have such properties as defined in this invention, and polyethylene naphthalate resin bottles in which gas barrier properties are extraordinarily improved cannot be obtained unless such properties as defined in this invention are provided.

OBJECT OF THE INVENTION

This invention is presented in the light of the above points, and it is, hence, a primary object of this invention to provide a bottle made of polyethylene naphthalate having extraordinarily excellent gas barrier properties and superior heat resistance and transparency, and a manufacturing method thereof.

ABSTRACT OF THE INVENTION

A first bottle according to the present invention is made of polyethylene naphthalate resin, which is formed by highly stretching the resin so that the stretch index defined below should be 130 cm or more.

$$\text{Stretch index} = \frac{\text{Internal volume of stretched bottle (excluding neck portion)}}{\text{Internal volume of preform before stretching (excluding neck portion)}} \times \frac{1}{f}$$

$$f = \frac{\text{Internal surface area of stretched bottle (excluding neck portion)}}{\text{Internal volume of stretched bottle (excluding neck portion)}} \quad (cm^{-1})$$

A method of manufacturing the first bottle of this invention comprises steps of forming preform from polyethylene naphthalate resin, and blowing and stretching the preform so that the stretch index defined above should be 130 cm or more.

A second bottle according to this invention is made of polyethylene naphthalate resin, wherein permeability constant Pc to carbon dioxide gas defined below is 0.13 cc·cm/day·atm or lower and the mean thickness constant tc at the intermediate part of bottle body excluding the neck, which is defined as follows, is 0.2 or lower.

$$Pc = P \times f$$

[wherein P denotes permeability of the entire bottle to carbon dioxide gas (cc/day atm), $f = S/v$ ($cm^{-1}$), S indicates the internal surface area of the stretched bottle (excluding internal surface area of the neck), and V is internal volume of the stretched bottle (excluding the volume at the neck).]

$$tc = t \times f \times 10$$

[wherein t is the mean thickness (mm) of the bottle body at the intermediate part excluding the neck, and f is defined same as above.]

A third bottle according to this invention is made of polyethylene naphthalate resin, of which X-ray interference intensity distribution curve on plural points on the surface of the bottle body at the intermediate portion (central portion) has local maximum values in both ranges of 0°±20° and 90°±2020 in β angle in a probability of at least 80% or more, preferably 90% or more and further preferably 95% or more.

Figure 1:
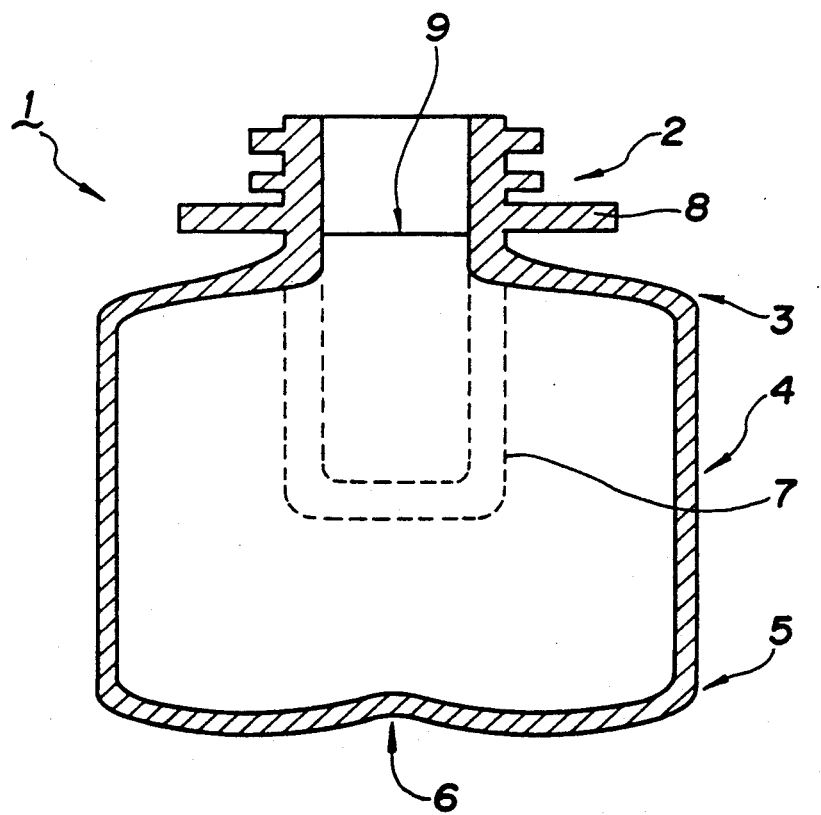
FIG. 1 is a schematic explanatory drawing of the bottle.

1 ... Bottle, 2 ... neck, 3 ... upper shoulder, 4 ... body, 5 ... lower shoulder, and 6 .. bottom.

DETAILED DESCRIPTION OF THE INVENTION

The bottle and producing methods thereof of this invention are explained in details below.

In this invention, polyethylene naphthalate resin is used for forming a bottle. The polyethylene naphthalate resin is desired to contain 60 mol% or more, preferably 80 mol% or more, and still more preferably 90 mol% or more of ethylene-2,6-naphthalate units which are introduced from 2,6-naphthalanedicarboxylic acid and ethylene glycol, but less than 40 mol% of structural units other than ethylene-2,6-naphthalate may be included.

These structural units other than ethylene-2,6-naphthalate are introduced from aromatic dicarboxylic acid including terephthalic acid, isophthalic acid, 2,7-naphthalenedicarboxylic acid, 2,5-naphthalenedicarboxylic acid, diphenyl-4,4'-dicarboxylic acid, 4,4'-diphenyl ether dicarboxylic acid, diphenylsulfonedicarboxylic acid, 4,4'-diphenoxyethane dicarboxylic acid, and dibromoterephthalic acid, aliphatic dicarboxylic acid including adipic acid, azelaic acid, sebacic acid, and decane dicarboxylic acid, alicyclic dicarboxylic acid including 1,4-cyclohexanedicarboxylic acid, cyclopropanedicarboxylic acid, hexahydroterephthalic acid, hydroxycarboxylic acid including glycolic acid, p-hydroxybenzoic acid, p-hydroxyethoxybenzoic acid, propylene glycol, trimethylene glycol, diethylene glycol, tetramethylene glycol, pentamethylene glycol, hexamethylene glycol, decamethylene glycol, neopentylene glycol, p-xylene glycol, 1,4-cyclohexanedimethanol, bisphenol A, p,p'-diphenoxysulfone, 1,4-bis(β-hydroxyethoxy)benzene, 2,2'-bis(p-β-hydroxyethoxyphenyl)propane, polyalkylene glycol, p-phenylenebis(-dimethylsiloxane), and glycelin.

The polyethylene naphthalate resin used in this invention, moreover, may contain a small amount, for example, 2 mol% or less of structural units introduced from polyfunctional compounds such as trimesic acid, trimethylolethane, trimethylolpropane, trimethylolmethane and pentaerythritol.

The polyethylene naphthalate resin used in this invention, furthermore, may contain a small amount, for example, 2 mol% or less of structural units introduced from monofunctional compounds such as benzoylbenzoic acid, diphenylsulfonemonocarboxylic acid, stearic acid, methoxypolyethylene glycol, and phenoxypolyethylene glycol.

Such a polyethylene naphthalate resin is substantially in a linear structure, which can be confirmed by the fact that the polyethylene naphthalate is dissolved in o-chlorophenol.

The intrinsic viscosity [$\eta$] of polyethylene naphthalate measured in o-chlorophenol at 25° C. is desired to be in a range from 0.2 to 1.1 dl/g, preferably from 0.3 to 0.9 dl/g and more preferably from 0.4 to 0.8 dl/g.

The intrinsic viscosity [$\eta$] of polyethylene naphthalate is here measured in the following method. That is, polyethylene naphthalate is dissolved in o-chlorophenol at the concentration of 1 g/100 ml, and the solution viscosity is measured at 25° C. by using Ubbellohde capillary viscometer. Then, by gradually adding o-chlorophenol, the solution viscosity on relatively low concentration is measured. The obtained data are used for extrapolation at 0% concentration, thereby determining the intrinsic viscosity [$\eta$].

The heat-up crystallizing temperature (Tc) of polyethylene naphthalate measured when the temperature is raised by differential scanning calorimeter (DSC) at a rate of 10° C./minute is usually 150° C. or higher, preferably in the range from 160° to 230° C. and more preferably from 170° to 220° C.

Here, the heat-up crystallizing temperature (Tc) of polyethylene naphthalate is measured in the following way. A thin piece about 10 mg of polyethylene naphthalate taken from the center part of polyethylene naphthalate chip dried for about 5 hours or longer at about 140° C. under the pressure of about 5 mmHg is encapsulated in an aluminum pan for liquid in the atmosphere of nitrogen, and presented for measurement using a differential scanning calorimeter model DSC-2 produced by Perkin Elmer. By rapidly raising the temperature from room temperature, the test piece is melted at 290° C. and kept for 10 minutes. Then, it is cooled down to room temperature. The peak temperature of exotherm detected when the temperature is raised again at a rate of 10° C./min thereafter is taken as the heat-up crystallizing temperature (Tc).

Such a polyethylene naphthalate can be prepared by the known methods.

To polyethylene naphthalate used in this invention, a variety of additives usually added to polyester such as thermostabilizers, weathering stabilizer, antistatic agents, lubricants, parting agents, pigment dispersants, pigments and dyes can be added to a certain degree unless the objects of this invention should be lost.

A first bottle according to the present invention is made of polyethylene naphthalate resin and formed by highly stretching a preform so that the stretch index defined below should be 130 cm or more, preferably 140 to 220 cm, and more preferably 150 to 200 cm.

$$\text{Stretch index} = \frac{\text{Internal volume of stretched bottle (excluding neck portion)}}{\text{Internal volume of preform before stretching (excluding neck portion)}} \times \frac{1}{f}$$

$$f = \frac{\text{Internal surface area of stretched bottle (excluding neck portion)}}{\text{Internal volume of stretched bottle (excluding neck portion)}} \text{ (cm}^{-1}\text{)}$$

Referring now to FIG. 1, the stretch index of the first bottle of this invention is explained. A bottle 1 of this invention, as shown in FIG. 1, comprises neck 2, upper shoulder 3, body 4, lower shoulder 5 and bottom 6.

When producing such a bottle 1, a preform 7 is used, which is expressed by a dot line in FIG. 1.

The internal volume of such a stretched bottle is defined as the internal volume of the stretched bottle 1 excluding the neck 2 portion, or in details, it means the internal volume of the bottle under a support ring 8, and more in details, the internal volume of the bottle under a virtual line 9.

The internal volume of the unstretched preform 5 means the internal volume of the preform 7 excluding the neck 2 portion, or in details, it means the internal volume of the preform 7 under a support ring 8, and more in details, the internal volume of the bottle under the virtual line 9.

The internal surface area of the stretched bottle means the internal surface area of the stretched bottle 1 excluding the neck portion, or in details, it means the internal surface area of the stretched bottle 1 under the support ring 8, and more in details, the internal surface area of the bottle under the virtual line 9.

The internal surface areas of the stretched bottle S (excluding the internal surface area of the neck) can be measured by micro division method having the steps of dividing the bottle into micro-parts, detecting the internal surface shape by using three-dimensional measuring device, and integrating the areas of the micro-parts. Here, when the stretched bottle is in a simple shape, the internal surface area can be obtained in an approximate value by assuming the bottle body to be cylindrical and both the upper and lower parts of the bottle to be hemispherical.

The stretch index of such a stretched bottle can be calculated by obtaining the internal volume of the stretched bottle (excluding the volume of the neck) and the internal volume of the unstretched bottle (excluding the volume of the neck) together with said internal surface area of the stretched bottle. The internal volume of the bottle can be easily measured by pouring liquid such as water into it. The units of value f and stretch index are $cm^{-1}$ and cm respectively.

In the first bottle according to the present invention, the thickness at the body is similar to the known bottle, which is usually 0.1 to 0.5 mm and preferably 0.2 to 0.4 mm.

The method of producing the above first bottle is, next, explained.

At first, a preform is formed from the above polyethylene naphthalate resin by conventionally known methods.

Such a preform can be produced by known methods, but in this invention, it is preferable to set the length of preform shorter than that in the known preform because this preform is stretched at a higher rate than in the known method. It is also possible to make the diameter of the preform shorter than that in the conventional preform, if necessary.

In this invention, such a preform of bottle as above is blown and molded into a bottle.

At this moment, blow molding is executed so that the stretch index of the obtained bottle defined above should be 130 cm or more, preferably 140 to 220 cm, and more preferably 150 to 200 cm.

The temperature at blow molding of the preform is desired to be set to 110° to 150° C., preferably 120 to 150° C. and more preferably 125° to 145° C.

Such a highly stretched bottle obtained from polyethylene naphthalate resin in the above way, of which stretch index defined above is 130 cm or higher, has extremely superior gas barrier properties, for example, about 20 times of gas barrier property to carbon dioxide ($CO_2$) and 7 times of that to oxygen ($O_2$) in comparison with conventionally commercially available polyethylene terephthalate bottle. Even in comparison with a polyethylene naphthalate resin bottle which is stretched so that the stretch index defined in this specification be 95 cm, the gas barrier property to carbon dioxide ($CO_2$) of this bottle according to this invention is improved by three times, and the gas barrier property to oxygen ($O_2$) is enhanced by two times.

The first bottle of this invention is also superior in heat resistance (Tg is about 120° C.) and moreover excellent in transparency and mechanical strength.

The second bottle of this invention is next explained. The second bottle is made of such a polyethylene naphthalate resin as above, wherein permeability constant Pc to carbon dioxide gas defined as follows is 0.13 cc·cm/day·atm or lower, preferably 0.12 cc·cm/day·atm or lower, and more preferably 0.10 cc·cm/day·atm or lower, and the mean thickness constant tc at the intermediate part (central portion) of bottle body excluding the neck, which is defined below, is 0.2 or lower, and preferably 0.18 or lower.

$$Pc = P \times f,$$

[wherein P denotes permeability of the entire bottle to carbon dioxide gas (cc/day·atm), $f = S/V$ ($cm^{-1}$), S indicates the internal surface area of the stretched bottle (excluding internal surface area of the neck), and V is the internal volume of the stretched bottle (excluding the volume at the neck).]

$$tc = t \times f \times 10,$$

[wherein t is the mean thickness (mm) of the bottle body at the intermediate part excluding the neck, and f is defined same as above.]

The permeability P (cc/day·atm) of such a polyethylene naphthalate resin bottle to carbon dioxide gas is measured in the following way. Dry ice is encapsulated in the stretched blow molded bottle while adjusting the volume of the dry ice so that the internal pressure of the bottle at 23° C. should be about 5 kg/$cm^{-2}$, and the bottle is allowed to stand in a thermostatic room at 23° C., 50% RH, and the time course change of the bottle weight is measured. The mean permeating volume of carbon dioxide gas (volume (cc) of carbon dioxide gas converted into 1 atm, 23° C.) per day from 7th to 21th after the encapsulation is divided by the internal pressure (atm) right after encapsulation of dry ice, thereby calculating the permeability. In the test, three bottles are used as samples and the mean value is determined therefrom.

The internal volume V and the internal surface area S of the stretched bottle can be measured in the same way as above.

The mean thickness t (mm) of the bottle body at the intermediate part excluding the neck can be obtained by dividing center part of the bottle into four, measuring the thickness (mm) at the four points, and calculating the mean value.

The gas barrier property corrected by thickness, which is measured in reference, is evaluated by generally employed carbon dioxide gas permeability constant Pd($CO_2$) and oxygen gas permeability constant Pd($O_2$). For that purpose, carbon dioxide gas permeability constant Pd($CO_2$) of some pieces of samples from the intermediate part of the bottle body with a thickness of 300 to 450 μm is measured by using a carbon dioxide gas permeability measuring apparatus Permatrarc-IV manufactured by Modern Control (U.S.A.) by Permatran method under the conditions of 23° C. and relative humidity 0%, and oxygen gas permeability constant $Pd(O_2)$ of some pieces of samples from the intermediate part of the bottle body with a thickness of 300 to 400 μm is measured by using Oxtran model 100 manufactured by Modern Control (U.S.A.) by Oxtran method under the conditions of 23° C. and relative humidity 0%.

The method of producing the second bottle of this invention is, sequentially, described. The bottle can be produced, for example, in the same way as in the first bottle of this invention, by blowing a preform made of polyethylane naphthalate resin, and stretching it so that the stretch index defined above should be 130 cm or more, preferably 140 to 220 cm, and more preferably 150 to 200 cm.

Such a second bottle according to this invention has extremely superior gas barrier properties, for example, about 20 times of gas barrier property to carbon dioxide ($CO_2$) and 7 times of that to oxygen ($O_2$) in comparison with conventionally commercially available polyethylene terephthalate bottle.

The third bottle according to the present invention is described below. The third bottle is formed by stretching the above polyethylene naphthalate resin, and it shows, in an X-ray interference intensity distribution curve on plural points on the circumference of the bottle body at the intermediate part, local maximum values in both ranges of $0°\pm20°$ and $90°\pm20°$ in $\beta$ angle in a probability of at least 80% or higher, preferably 90% of higher, and more preferably 95% or higher.

The method of measuring X-ray interference intensity distribution on the circumference of the stretched bottle body made of polyethylene naphthalate resin at the intermediate part is explained below.

The intermediate part of body 4 of such a stretched bottle 1 as shown in FIG. 1 is cut out, and a plurality of, usually 5 or more, and preferably 5 to 10, samples (2 cm × 2 cm) are taken from the circumference of the intermediate part, which are set on a sample holder of an X-ray fiber specimen attachment. Here, the intermediate part of the body 4 indicates a portion including the mid-point of the bottle height below the virtual line 9 drawn at the lower end of the neck 2 in FIG. 1.

The X-ray interference intensity distribution of such samples is measured. A sample is revolved around the normal of the sample surface, and the intensity distribution of a specific X-ray diffraction peak is measured. The measuring conditions are as follows.

X-ray diffractometer: RU 300 produced by Rigaku Denki
Target : Cu target (point focus)
Voltage, current : 50 KV, 300 mA
Accessory : Fiber specimen attachment
Slit system :
    Collimater: 1 mm $\phi$
    Lengthwise slit: 1.9 mm
    Crosswise slit: 1.8 mm
$\alpha$ angle : 30°, static
$2\theta$: 15.4°
$\theta$ 7.7°, static
$\beta$ angle revolution rate : 8°/min
$\beta$ angle is defined as follows.

The angle when circumferential direction of the bottle points to the horizontal direction is regarded as 0°, and that to the vertical direction is regarded as 90°.

Figure 2:
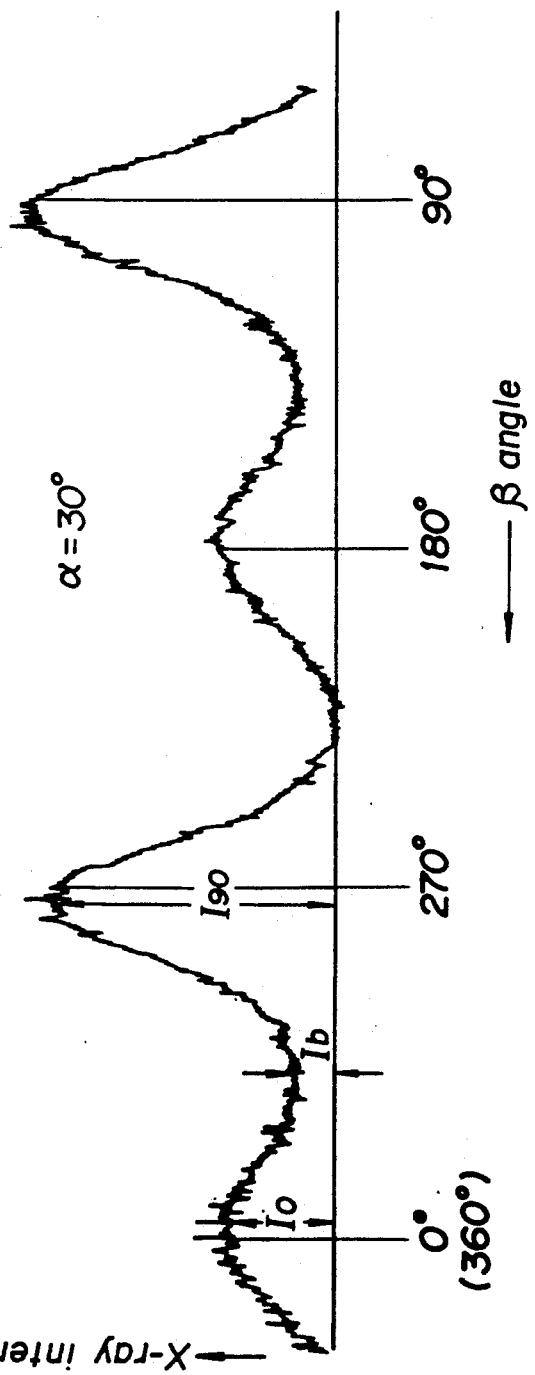
FIG. 2 is an X-ray interference intensity distribution curve on the surface at the intermediate portion of the bottle made of polyethylene naphthalate of the present invention.

The X-ray interference intensity distribution curve of samples taken from the intermediate part of the bottle body obtained thereby is shown in FIG. 2. Whether any local maximum values are recognized in the X-ray interference intensity distribution curve or not is determined in the following way. A tangent is, at first, drawn at the bottom where the intensity distribution curve shows the lowest value, and it is defined as a base line. The height from the base line to the second lowest point between 0° and 360° is defined as $I_b$. Sequentially, a smaller value of the two local maximum values obtained respectively in the ranges of $0°\pm20°$ and $18°\pm20°$ is defined as $I_0$ and a smaller value of the local maximum values obtained respectively in the ranges of $90°\pm20°$ and $270°\pm20°$ is defined as $I_{90}$. At this moment, if both $I_0/I_b$ and $I_{90}/I_b$ are 1.1 or higher, and preferably 1.5 or higher, it is judged that a local maximum value exists.

The third bottle according to the present invention made of polyethylene naphthalate resin shows, in an X-ray interference intensity distribution curve on plural points on the circumference of the bottle body at the intermediate part, local maximum values in both ranges of $\beta$ angle $0°\pm20°$ and $90°\pm20°$ in a probability of at least 80% or higher, preferably 90% or higher, and further preferably 95% or higher.

To the contrary, a conventionally known low-stretched polyethylene naphthalate resin bottle shows, in an X-ray interference intensity distribution curve in plural points on the circumference of the stretched bottle body at the intermediate part measured in the above way, local maximum values in both ranges of $\beta$ angle $0°\pm20°$ and $90°\pm20°$ in a possibility of only less than 80%, and normally less than 60%.

Next, a 34 mm$\phi$ of sample is taken out from the circumference at the intermediate part of the stretched bottle body, and it is set on a sample holder of a pole figure measuring instrument, thereby measuring a pole figure on the face of $2\theta=15.4°$ (010).

The pole figure is measured under the following conditions.

Figure 3:
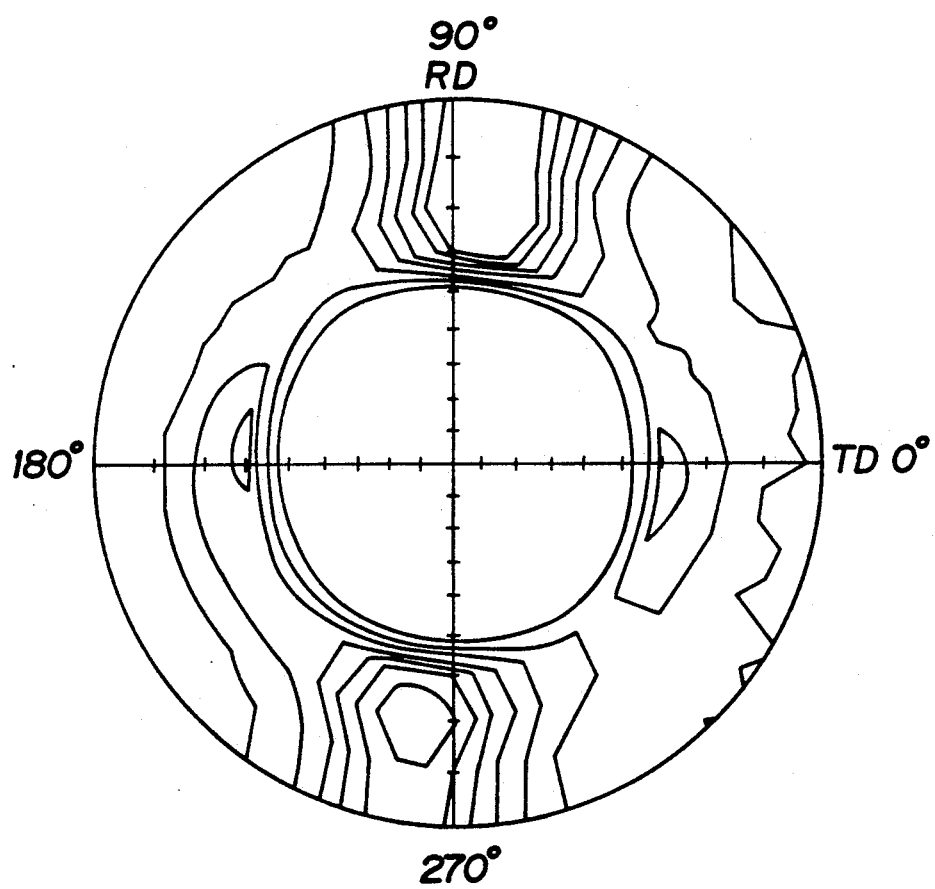
FIG. 3 is an X-ray pole figure on the surface of the bottle made of polyethylene naphthalate according to this invention at the intermediate portion of the body.

(1)
    Instrument : Model RU300 produced Rigaku Denki Co., Ltd.
    Cu target, point focus
    Voltage, current: 50 KV, 300 mA
    Accessory: Fully automatic pole figure measuring unit
(2) Test sample : A piece of 34 mm$\phi$ around the point to be measured is taken out and fixed on the holder.
(3) Measuring conditions
    Slit system
    D.S.O.1 R.S 1 S.S 4 Ni filter
    Limiting slit is used in reflection method.
Condition input of the pole specimen attachment
    Mode (1) 1 Continuous Scan
    Mode (2) Circular
    Alpha Start 0
    Alpha Stop 40
    Alpha Start 40
    Alpha Stop 90
    Alpha Step 10
    Beta Start 0
    Beta Stop 360
    Beta Speed 360
    Measurement : Decker method + Suhulz's reflection method
    Peak $2\theta=15.4°$
    B.G $2\theta=20.0°$
    No $\gamma$ vibration An example of X-ray pole figure of a sample at the intermediate part of the bottle body obtained thereby is shown in FIG. 3. In this X-ray pole figure, poles appear at the points slightly diverging from 0°, 90°, 180° and 270° in β angle, which suggests that the molecular chain of polyethylene naphthalate, which composes the bottle, slightly deflects in the longitudinal and circumferential directions. The deflection, however, is within a range of ±20° in the third stretched bottle according to the invention.

The method of producing such a third bottle of this invention as described above is explained below. This bottle can be produced, for example, in the same way as the first bottle of the present invention, by blowing a preform made of polyethylene naphthalate resin and stretching it so that the stretch index defined above should be 130 cm or more, preferably 140 to 220 cm, and further preferably 150 to 200 cm.

Such a third bottle according to this invention has extremely superior gas barrier properties, for example, about 20 times of gas barrier property to carbon dioxide ($CO_2$) and 7 times of that to oxygen ($O_2$) in comparison with conventionally commercially available polyethylene terephthalate bottle.

EFFECTS OF THE INVENTION

The bottle according to the present invention has greatly improved gas barrier properties to oxygen or carbon dioxide, and also superior heat resistance, transparency and mechanical strength.

This invention is explained on some examples below, but it is, of course, that the present invention should not be limited to these examples.

EXAMPLE 1

Polyethylene naphthalate resin obtained from 2,6-dinaphthalene dicarboxylic acid and ethylene glycol, and having the following physical properties was molded by injection machine M-100A made by Meiki Seisakusho into a preform for bottle. The forming temperature at this moment was from 270° to 290° C.

Polyethylene naphthalate resin :
Intrinsic viscosity [η]: 0.6 dl/g
Heat-up crystallizing temperature (Tc) : 180° C.

The preform obtained thereby wa next molded by blowing machine LB-01 made of Corpoplast into a biaxially oriented bottle. The stretching temperature at this time was 130° to 140° C.

The internal volume of the unstretched preform (excluding the neck portion) was 19 cm and that of the obtained stretched bottle (excluding the neck portion) was 1469 cm².

The internal surface area of the stretched bottle (excluding the internal surface area at the neck portion) was 678 cm².

The stretch index was therefore calculated as follows.

Stretch index = 1469/19 × 1/0.46 = 168

The permeability to carbon dioxide gas measured, after encapsulating dry ice in the stretched blow molded bottle by adjusting the volume of dry ice so that the internal pressure at 23° C. should be about 5 kg/cm², by measuring the time course change of the weight while allowing the bottle to stand in a thermostatic room at 23° C., 50% RH, and by dividing the mean permeating volume of carbon dioxide gas (volume (cc) of carbon dioxide gas converted into 1 atm, 23° C.) per day from 7th to 21th of encapsulation by the internal pressure (atm) right after encapsulation of dry ice. In the test, three bottles were used as samples and the mean value was determined therefrom.

The gas barrier property corrected by thickness was evaluated by carbon dioxide gas permeability constant $Pd(CO_2)$ and oxygen gas permeability constant $Pd(O_2)$. For that purpose, the carbon dioxide gas permeability constant of some sample pieces from the intermediate part of the bottle body with a thickness of 300 to 450 μm was measured by using a carbon dioxide gas permeability measuring apparatus Permatrarc-IV manufactured by Modern Control (U.S.A.) by Permatran method under conditions of 23° C. and relative humidity 0% and the oxygen gas permeability constant $Pd(O_2)$ of some pieces of samples from the intermediate point of the bottle body with a thickness of 300 to 400 μm was measured by using Oxtran model 100 manufactured by Modern Control (U.S.A.) by Oxtran method under the conditions of 23° C. and relative humidity 0%.

As for transparency, by cutting the body of bottle, haze of the test piece was measured by using hazemeter NDH-20D produced by Nihon Denshoku, by a method conforming to ASTM D 1003, for three times, and transparency was judged by the mean value.

The data are shown in TABLE 1.

COMPARATIVE EXAMPLE 1

The same test as example 1 was repeated only by modifying the stretch index of the bottle to 95 cm.
Obtained data are shown in TABLE 1.

COMPARATIVE EXAMPLE 2

The same test as example 1 was repeated only by using polyethylene terephthalate instead of polyethylene naphthalate.
The data are shown in TABLE 1.

TABLE 1

|  | Example 1 (Polyethylene naphthalate) | Com. Ex. 1 (Polyethylene naphthalate) | Com. Ex. 2 (Polyethylene terephthalate) |
| --- | --- | --- | --- |
| Stretch index (cm) | 168 | 95 | 168 |
| Bottle body thickness (mm) | 0.37 | 0.33 | 0.40 |
| Transparency % | | | |
| Entire haze | 1.7 | 2.5 | 4.2 |
| Internal haze | 1.0 | 2.0 | 4.0 |
| Pressure resistance (30° C.) kg/cm² | 14.5 | 13.7 | 11.9 |
| Buckling strength (kg) V = 10 mm/min | 31 | 25 | 45 |
| $CO_2$ permeability [P], 23° C., 0% RH (cc/day · atm) | 0.11 | 0.34 | 2.12 |
| $CO_2$ permeability constant [$Pd(CO_2)$], 23° C., 0% RH (cc · mm/m² · D · atm) | 0.52 | 1.40 | 8.60 |

TABLE 1-continued

| | Example 1 (Polyethylene naphthalate) | Com. Ex. 1 (Polyethylene naphthalate) | Com. Ex. 2 (Polyethylene terephthalate) |
| --- | --- | --- | --- |
| $O_2$ permeability constant [Pd($O_2$)], 23° C., 0% RH (cc · mm/m² · D · atm) | 0.23 | 0.50 | 1.79 |
| Bottle internal surface area S (cm²) | 678 | 678 | 678 |
| Bottle internal Volume V (cm²) | 1469 | 1469 | 1469 |
| f(cm⁻¹) | 0.45 | 0.45 | 0.45 |
| tc | 1.665 | 1.485 | 1.800 |
| $CO_2$ permeability constant (Pc) (cc · mm/day · atm) | 0.050 | 0.15 | 0.95 |

EXAMPLE 2

The intermediate part of the bottle body obtained in Example 1 was cut out, and 5 pieces of samples were taken out from this intermediate portion with a certain interval and presented for measuring the X-ray interference intensity distribution curve. By measuring $I_0$ and $I_{90}$ at each point of 0°±20° or 180°±20°, and 90°±20° or 270°±20° in β angle, $I_0/I_b$ and $I_{90}/I_b$ were calculated respectively.

The data are shown in TABLE 2.

Deviation of the β angle from 0° to the point where the local maximum is recognized is expressed by $\phi_0$, and that from 90° is expressed by $\phi_{90}$, and the result are shown in TABLE 2.

The X-ray interference intensity distribution curve and X-ray pole figure at measuring point 3 in TABLE 2 are shown in FIG. 2 and FIG. 3.

COMPARATIVE EXAMPLE 3

On the bottle obtained in Comparative example 1 X-ray interference intensity distribution curve was measured in the same way as Example 2, and the result is shown in TABLE 3.

TABLE 2

| Bottle of Example 2 | 1 | 2 | 3 | 4 | 5 |
| --- | --- | --- | --- | --- | --- |
| $I_0/I_b$ | 1.49 | 6.17 | 2.69 | 1.18 | 1.43 |
| $I_{90}/I_b$ | 5.17 | 13.7 | 7.31 | 2.95 | 4.93 |
| $\phi_0$ | 1.6 | 2.4 | 2.4 | 4.8 | 3.2 |
| $\phi_{90}$ | 7.6 | 4.4 | 3.2 | 11.5 | 4.0 |

Numerals 1 to 5 next to the title indicate the measuring points.

TABLE 3

| Bottle of Comparative Example 3 | 1 | 2 | 3 | 4 | 5 |
| --- | --- | --- | --- | --- | --- |
| $I_0/I_b$ | 1.1 | 2.5 | 3.5 | — | — |
| $I_{90}/I_b$ | 1.5 | 2.9 | 3.5 | — | — |
| $\phi_0$ | 7.2 | 0.8 | 6.4 | 14.4 | 4 |
| $\phi_{90}$ | 15.2 | 10.4 | 13.6 | — | — |

—: Having no local maximum value

What is claimed is:

1. A bottle made of polyethylene naphthalate resin, which is produced by highly stretching a preform so that (a) the stretch index defined as follows being 140 cm or higher:

$$\text{Stretch index} = \frac{\text{Internal volume of stretched bottle (excluding neck portion)}}{\text{Internal volume of preform before stretching (excluding neck portion)}} \times \frac{1}{f}$$

$$f = \frac{\text{Internal surface area of stretched bottle (excluding neck portion)}}{\text{Internal volume of stretched bottle (excluding neck portion)}} \text{ (cm}^{-1}\text{)}$$

(b) permeability constant Pc to carbon dioxide gas defined below is 0.13 cc·cm/day·atom or lower;

$$Pc = P \times f$$

wherein P denotes permeability of the entire bottle to carbon dioxide gas (cc·day/atom), f=S/V (cm⁻¹), s indicates internal surface are of the stretched bottle (excluding internal surface area of the neck), and V is internal volume of the stretched bottle (excluding the volume at the neck).

(c) the mean thickness constant tc at the intermediate part of bottle body, excluding the neck, which is defined below, is 0.2 or lower; and $$tc = t \times f \times 10$$

wherein t is the mean thickness (mm) of the bottle body at the intermediate part excluding the neck, and f is defined same as above; and (d) x-ray interference intensity distribution curve on plural points on the surface of the bottle body at the intermediate part has local maximum values in both ranges of 0°±20° and 90°±20° in β angle in a probability of at least 80%.

2. A bottle as set forth in claim 1, wherein the stretch index is from 140 to 220 cm.

3. A method for producing a bottle comprising forming a preform from polyethylene naphthalate resin, and blow molding the preform so that the stretch index defined as follows, is at least 130 cm;

$$\text{Stretch index} = \frac{\text{Internal volume of stretched bottle (excluding neck portion)}}{\text{Internal volume of preform before stretching (excluding neck portion)}} \times \frac{1}{f}$$

$$f = \frac{\text{Internal surface area of stretched bottle (excluding neck portion)}}{\text{Internal volume of stretched bottle (excluding neck portion)}} \text{ (cm}^{-1}\text{)}$$

permeability constant Pc to carbon dioxide gas defined below is 0.13 cc·cm/day·atom or lower;

wherein P denotes permeability of the entire bottle to carbon dioxide gas (cc·day/atom), $f=S/V$ (cm$^{-1}$), s indicates internal surface area of the stretched bottle (excluding internal surface area of the neck), and V is internal volume of the stretched bottle (excluding the volume at the neck);

the mean thickness constant tc at the intermediate part of bottle body, excluding the neck, which is defined below, is 0.2 or lower; and $$tc = t \times f \times 10$$

wherein t is the mean thickness (mm) of the bottle body at the intermediate part excluding the neck, and f is defined same as above; and X-ray interference intensity distribution curve on plural points on the surface of the bottle body at the intermediate part has local maximum values in both ranges of 0°±20° and 90°±20° in β angle in a probability of at least 80%.

4. A method of producing bottles as set forth in claim 3, wherein the preform is highly stretched so that the stretch index be 140 to 220 cm.

5. A bottle as set forth in claim 1, wherein Pc is 0.10 cc·cm/day·atom or lower.

6. A bottle as set forth in claim 1, wherein tc is 0.18 or lower.

7. A bottle as set forth in claim 1, wherein local maximum values are found in both ranges of 0°±20° and 90°±20° in β angle in a probability of at least 90%.

8. A bottle as set forth in claim 1, wherein the polyethylene naphthalate resin contains ethylene-2,6-naphthalate units derived from 2,6,-naphthalenedicarboxylic acid and ethylene glycol in the amount of 60 mol% or more.

9. A method as set forth in claim 3, wherein Pc is 0.10 cc·cm/day·atom or lower.

10. A method as set forth in claim 3, wherein tc is 0.18 or lower.

11. A method as set forth in claim 3, wherein local maximum values in both ranges of 0°±20° and 90°±20° in β angle in a probability of at least 90%.

12. A method as set forth in claim 3, wherein the polyethylene naphthalate resin contains ethylene-2,6-naphthalate units derived from 2,6,-naphthalenedicarboxylic acid and ethylene glycol in the amount of 60 mol% or more.

13. A bottle as set forth in claim 1, wherein the polyethylene naphthalate resin contains ethylene-2,6-naphthalate units derived from 2,6,-naphthalenedicarboxylic acid and ethylene glycol in the amount of 80 mol% or more.

14. A bottle as set forth in claim 1, wherein the polyethylene naphthalate resin contains ethylene-2,6-naphthalate units derived from 2,6,-naphthalenedicarboxylic acid and ethylene glycol in the amount of 90 mol% or more.

* * * * *

UNITED STATES PATENT AND TRADEMARK OFFICE
CERTIFICATE OF CORRECTION

PATENT NO. : 5,102,705

DATED : April 7, 1992

INVENTOR(S) : Yamamoto, et al.

It is certified that error appears in the above-identified patent and that said Letters Patent is hereby corrected as shown below:

On title page, item [75] and item [19]
delete "Yammoto", each occurrence, and substitute therefor --Yamamoto--.

Signed and Sealed this

Thirteenth Day of July, 1993

Attest:

MICHAEL K. KIRK

*Attesting Officer*  *Acting Commissioner of Patents and Trademarks*